United States Patent [19]

Fain

[11] Patent Number: 5,380,170

[45] Date of Patent: Jan. 10, 1995

[54] SCROLL COMPRESSOR OIL PUMPING SYSTEM

[75] Inventor: Gary K. Fain, Sidney, Ohio

[73] Assignee: Copeland Corporation, Sidney, Ohio

[21] Appl. No.: 134,059

[22] Filed: Oct. 12, 1993

[51] Int. Cl.⁶ .......................... F01C 1/04; F01C 21/04; F04B 35/04; H02K 9/00

[52] U.S. Cl. .................. 417/410.5; 418/55.6; 418/88; 418/151; 184/6.18; 310/54; 310/58

[58] Field of Search ............ 417/410 D, 902; 418/55.6, 88, 94, 151; 184/6.18; 310/54, 58

[56] References Cited

U.S. PATENT DOCUMENTS

| 1,797,287 | 3/1931 | Kucher . |
| 2,066,177 | 12/1936 | Johnson . |
| 2,069,767 | 2/1937 | McCormack . |
| 2,178,811 | 11/1939 | Sateren . |
| 2,683,233 | 7/1954 | Ruhl . |
| 2,883,101 | 4/1959 | Kosfeld . |
| 3,147,914 | 9/1964 | Hatten et al. . |
| 3,480,205 | 11/1969 | Hatten . |
| 3,565,553 | 2/1971 | Rinehart et al. . |
| 3,614,384 | 10/1971 | Heitchue, Sr. .................. 417/312 |
| 3,664,771 | 5/1972 | Suzuki et al. . |
| 4,127,994 | 12/1978 | Niven .................. 62/468 |
| 4,445,056 | 4/1984 | Gaylord .................. 310/54 |
| 4,517,479 | 5/1985 | Alcem et al. .................. 310/54 |
| 4,545,743 | 10/1985 | Earley .................. 417/372 |
| 4,565,503 | 1/1986 | Wise .................. 417/372 |
| 4,569,639 | 2/1986 | Hannibal et al. .................. 417/368 |
| 4,609,334 | 9/1986 | Muir et al. .................. 418/57 |
| 4,621,993 | 11/1986 | Nakamura et al. .................. 418/55.5 |
| 4,730,988 | 3/1988 | Ma .................. 417/313 |
| 4,895,496 | 1/1990 | Elson .................. 417/372 |
| 4,934,905 | 6/1990 | Richardson, Jr. .................. 417/372 |
| 5,064,356 | 11/1991 | Horn .................. 417/902 |

FOREIGN PATENT DOCUMENTS

| 60-237182 | 11/1985 | Japan . |
| 62-143081 | 9/1987 | Japan . |
| 4124485 | 4/1992 | Japan .................. 418/151 |

*Primary Examiner*—John J. Vrablik
*Attorney, Agent, or Firm*—Harness, Dickey & Pierce

[57] ABSTRACT

A scroll machine has a cover plate attached to the lower bearing housing which is adjacent the lower motor windings of the scroll machine. The cover plate has a plurality of grooves which work in conjunction with a lower counterweight of the scroll machine to circulate the lubricating oil located in the sump around the lower motor winding to cool the motor.

12 Claims, 3 Drawing Sheets

SCROLL COMPRESSOR OIL PUMPING SYSTEM

FIELD OF THE INVENTION

The present invention generally relates to scroll-type machinery. More particularly, the present invention relates to a scroll type machine which includes a lower housing which is adapted to prevent lower counterweight oil pumping power loss and to provide additional motor cooling.

BACKGROUND AND SUMMARY OF THE INVENNTION

Scroll machinery for fluid compression or expansion is typically comprised of two upstanding interfitting involute spirodal wraps or scrolls which are generated about respective axes. Each respective scroll is mounted upon an end plate and has a tip disposed in contact or near contact with the end plate of the other respective scroll. Each scroll further has flank surfaces which adjoin, in moving line contact or near contact, the flank surfaces of the other respective scroll to form a plurality of moving chambers. Depending upon the relative orbital motion of the scrolls, the chambers move from the radially exterior ends of the scrolls to the radially interior ends of the scroll for fluid compression, or from the radially interior ends of the scrolls to the radially exterior ends of the scrolls for fluid expansion. The scrolls, to accomplish the formation of the chambers, are put in relative orbital motion by a drive mechanism. Either one of the scrolls may orbit or both may rotate eccentrically with respect to one another.

A typical scroll machine, according to the design which has a non-orbiting scroll, includes an orbiting scroll which meshes with the non-orbiting scroll, a thrust bearing to take the axial loads on the orbiting scroll, and a lubricant supply system for lubricating the various moving components of the machine including the thrust bearing.

The typical lubricant supply system incorporates a lubricant sump in the lower or bottom portion of the housing into which the drive shaft extends so as to pump lubricant therefrom to the various portions of the compressor requiring lubrication. In addition, the lubricant also often acts to aid in the removal of heat from the various components of the compressor. In order to insure that sufficient lubricating oil is contained within the sump to assure adequate lubrication and/or cooling of the moving parts while also minimizing the overall height of the housing, it is sometimes necessary that the lubricant level within the housing extend above the rotating lower end of the rotor. The higher viscosity of the lubricant as compared to refrigerant gas can create an increased drag on rotation of the portion of the rotor submersed in lubricant, thus resulting in increased power consumption. This problem can be further aggravated in scroll-type compressors which employ a counterweight secured to the lower end of the rotor and thus also submersed in the lubricant.

U.S. Pat. No. 4,895,496 discloses a cup-shaped shield member which projects above the oil level in the sump and is positioned in surrounding relationship to the lower end of the rotor via a close fit with the drive shaft whereby the oil level in the area within the shield is reduced by the initial rotation of the rotor upon startup and return oil flow into this area is greatly restricted. Thus, the oil induced drag on the rotor and the resulting increased power consumption of the motor is greatly reduced. In one embodiment, a rotation inhibiting projection is provided on the shield while in another embodiment the shield is allowed to rotate with the drive shaft although the speed of rotation thereof will be substantially less than that of the drive shaft due to the drag exerted thereon by the lubricant. In both embodiments, however, the power consumption of the motor is greatly reduced thus resulting in significant improvement in the operating efficiency of the compressor.

While the above described shield does reduce motor power consumption by substantially eliminating the viscous drag of the lubricant on the rotor, it also eliminates or significantly reduces the amount of lubricant being circulated across the lower end turns of the stator. In some applications, it may be desirable to achieve the advantages of this higher operating efficiency while also maintaining a substantial flow of lubricant across the stator end turns for cooling of same.

U.S. Pat. No. 5,064,356 discloses a shield which is carried by the drive shaft and allowed to freely rotate therewith. This shield incorporates a generally flat circular disk or flange positioned in close proximity to the lower end of the rotor which serves to restrict return flow of oil to the area of the rotating rotor and/or counterweight but still enables some circulation of oil across the adjacent stator end turns. This increase in lubricant circulation results in improved cooling of the stator end turns without any substantial effect on the overall operating efficiency of the compressor.

While the above described shield in the U.S. Pat. No. 5,064,356 does allow for the increase in circulation of oil across the adjacent stator end turns, this approach, similar to the approach taken in the U.S. Pat. No. 4,895,496 completely isolates the lower counterweight from the oil sump. The lower counterweight due to its rotation within the compressor has a large pumping capacity. This pumping capacity could be utilized to improve the oil circulation in the area surrounding the motor stator to improve motor cooling.

The present invention provides an oil circulation system which does not isolate the lower counterweight but restricts the oil circulation around the lower end of the motor stator in such a way that it controls the oil circulation's net effect on motor cooling as well as power loss versus the oil level within the lubrication sump.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention.

DETAILED DESCRIPTION OF THE PREFERRED EMBODIMENT

Figure 1:
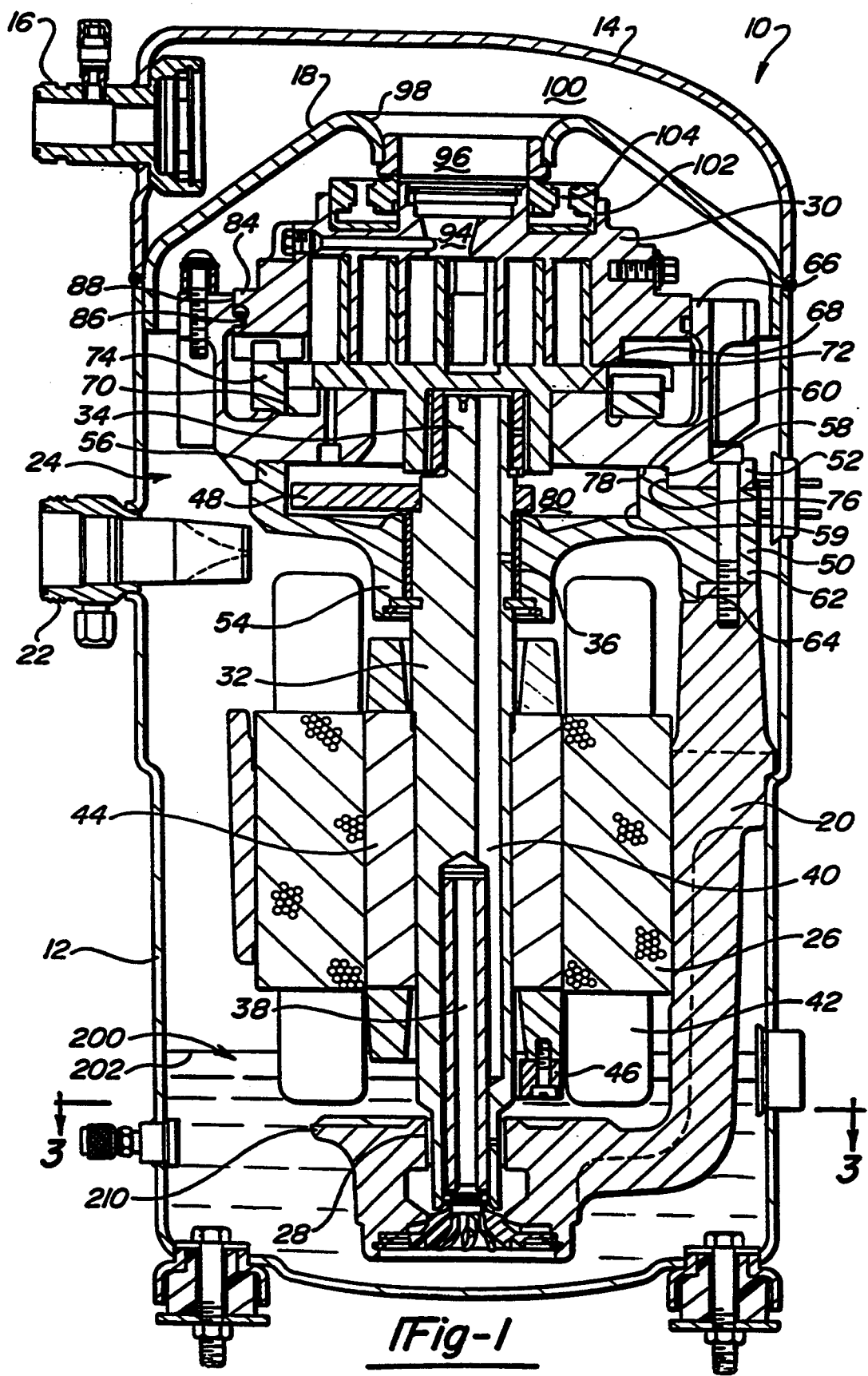
FIG. 1 is a vertical sectional view through a hermetic scroll compressor embodying the principles of the present invention.

While the present invention is suitable for incorporation into many different types of scroll machines, for exemplary purposes it will be described herein incorporated into a scroll compressor. Referring now to the drawings in which like reference numerals designate like or corresponding parts throughout the several views, there is shown in FIG. 1 a vertical sectional view of a scroll compressor 10 incorporating the lubrication system according to the present invention. Generally speaking, compressor 10 comprises a generally cylindrical hermetic shell 12 having welded at the upper end thereof a cap 14. Cap 14 is provided with a refrigerant discharge fitting 16 optionally having the usual discharge valve therein (not shown). Other elements affixed to cylindrical shell 12 include a transversely extending partition 18 which is welded about its periphery at the same point cap 14 is welded to shell 12, a lower bearing housing 20 which is affixed to shell 12 at a plurality of points by methods known well in the art, and a suction gas inlet fitting 22.

Lower bearing housing 20 locates and supports within shell 12 a main bearing housing 24, a motor stator 26, a lower bearing 28 and a non-orbiting scroll member 30. A crankshaft 32 having an eccentric crank pin 34 at the upper end thereof is rotatably journaled in lower bearing 28 in lower bearing housing 20 and in an upper bearing 36 in main bearing housing 24. Crankshaft 32 has at its lower end the usual relatively large diameter oil-pumping concentric bore 38 which communicates with a smaller diameter bore 40 extending upwardly therefrom to the top of crankshaft 32. The lower portion of cylindrical shell 12 is filled with lubricating oil in the usual manner. Pumping bore 38 at the bottom of crankshaft 32 is the primary pump acting in conjunction with bore 40 to pump lubricating fluid to all the various portions of the compressor which require lubrication as will be described later herein.

Crankshaft 32 is rotatably driven by an electric motor including motor stator 26 having motor windings 42 passing therethrough, and a motor rotor 44 press fit on crankshaft 32 and having a lower counterweight 46 and an upper counterweight 48.

Main bearing housing. 24 includes a bearing cage 50 and an upper bearing housing 52. Bearing cage 50 has a generally cylindrical shaped central portion 54 within which the upper end of crankshaft 32 is rotatably supported by means of bearing 36. An upstanding annular projection 56 is provided on bearing cage 50 adjacent the outer periphery of central portion 54 and includes an accurately machined radially outwardly facing surface 58, an accurately machined radially inwardly facing surface 59 and an upwardly facing locating surface 60. A plurality of radially circumferentially spaced supporting arms 62 extend generally radially outwardly from central portion 54 and include axially extending portions adapted to engage and be supported on lower bearing housing 20. A step 64 is provided on the terminal end of the axially extending portion of each of the supporting arms 62 for engaging lower bearing housing 20. Step 64 is designed to mate with a corresponding recess provided on the abutting portion of lower bearing housing 20 for aiding in radially positioned bearing cage 50 with respect to lower bearing housing 20.

Upper bearing housing 52 of main bearing housing 24 is generally cup-shaped including an upper annular guide ring portion 66 integrally formed therewith, an annular axial thrust bearing surface 68 disposed below ring portion 66, and a second annular supporting bearing surface 70 positioned below and in radially outwardly surrounding relationship to axial thrust bearing surface 68. Axial thrust bearing surface 68 serves to axially movably support an orbiting scroll member 72, and supporting bearing surface 70 provides support for an Oldham coupling 74. The lower end of upper bearing housing 52 includes an annular recess defining radially inwardly and axially downwardly facing surfaces 76, 78 respectively which are designed to mate with surfaces 58 and 60 respectively of bearing cage 50 to aid in axially and radially positioning bearing cage 50 and upper bearing housing 52 relative to each other. Additionally, a cavity 80 is designed to accommodate rotational movement of upper counterweight 48 secured to crankshaft 32 at the upper end thereof. The provision of this cavity enables counterweight 48 to be positioned in closer proximity to orbiting scroll member 72 thus enabling the overall size thereof to be reduced.

Annular integrally formed guide ring 66 is positioned in surrounding relationship to a radially outwardly extending flange portion 84 of non-orbiting scroll member 30 and includes a radially inwardly facing surface 86 adapted to abut a radially outwardly facing surface 88 of flange portion 84 so as to radially and axially position non-orbiting scroll member 30.

Non-orbiting scroll member 30 has a centrally disposed discharge passageway 94 communicating with an upwardly open recess 96 which is in fluid communication via an opening 98 in partition 18 with a discharge muffler chamber 100 defined by cap 14 and partition 18. Non-orbiting scroll member 30 further has in the upper surface thereof an annular recess 102 having parallel coaxial side walls in which is sealingly disposed for relative axial movement an annular floating seal 104 which serves to isolate the bottom of recess 102 from the presence of gas under suction and discharge pressure so that it can be placed in fluid communication with a source of intermediate fluid pressure by means of a passageway (not shown). Non-orbiting scroll member 30 is thus axially biased against orbiting scroll member 72 by the forces created by discharge pressure acting on the central portion of non-orbiting scroll member 30 and those created by intermediate fluid pressure acting on the bottom of recess 102. This axial pressure biasing, as well as other various techniques for supporting scroll member 30 for limited axial movement, are disclosed in much greater detail in assignee's U.S. Pat. No. 4,877,382, the disclosure of which is hereby incorporated herein by reference.

Relative rotation of the scroll members is preferably prevented by the usual Oldham coupling 74 of the type disclosed in the above referenced U.S. Pat. No. 4,877,382, however, the coupling disclosed in assignee's copending application Ser. No. 591,443 entitled "Oldham Coupling for Scroll Compressor" filed Oct. 1, 1990, now U.S. Pat. No. 5,320,506, the disclosure of which is hereby incorporated herein by reference, may be used in place thereof.

The compressor is preferably of the "low side" type in which suction gas entering via gas inlet 22 is allowed, in part, to escape into shell 12 and assist in cooling the motor. So long as there is an adequate flow of returning suction gas the motor will remain within desired temperature limits. When this flow drops significantly, however, the loss of cooling will eventually cause a temperature sensor to signal the control device and shut the machine down.

The scroll compressor as thus far broadly described is either now known in the art or is the subject matter of other pending applications for patent by applicant's assignee. The details of construction which incorporate the principles of the present invention are those which deal with a unique lubrication circulation system, indicated generally at 200.

Lower counterweight 46 and a portion of motor windings 42 of motor stator 26 extend below the oil level 202 located within the lower portion of cylindrical shell 12. Lower counterweight 46 and approximately one-half of motor windings 42 of motor stator 26 are completely covered by a cylindrical cover plate 210. Cover plate 210 is an integral part of lower bearing housing 20 and is located a distance "h" below the bottom of motor windings 42. Cover plate 210 restricts but does not isolate oil circulation to lower counterweight 46. Lower counterweight 46 has a large pumping capacity but since its suction area is, highly restricted, large scale cavitation is created all around lower counterweight 46. This large scale cavitation reduces the power consumed by lower counterweight 46 as it rotates within the lubricant sump, but it still allows for some oil circulation which promotes motor cooling heat transfer by convection into the circulating oil. The oil in turn is cooled by suction gas convection.

Figure 2:
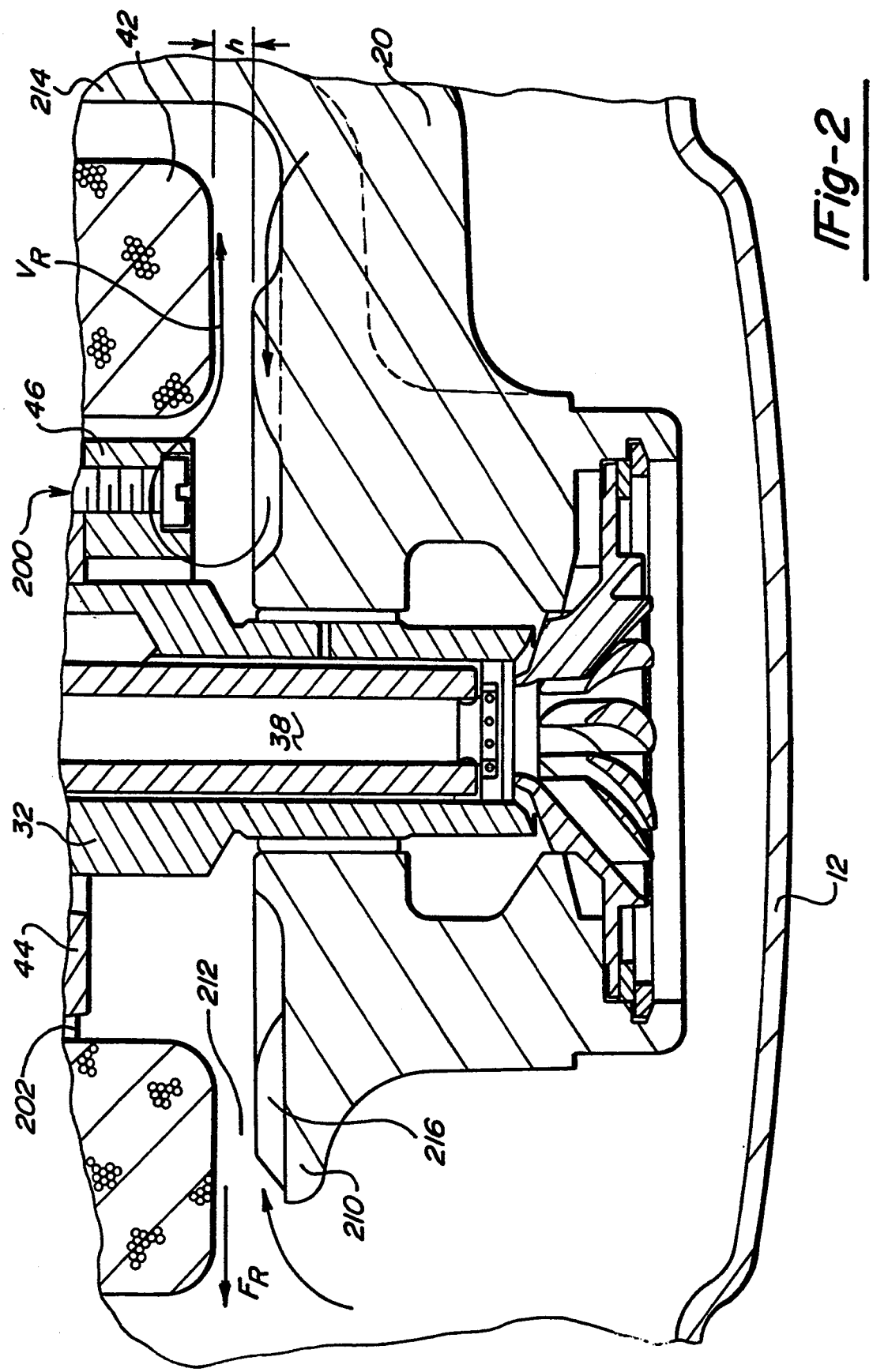
FIG. 2 is an enlarged vertical cross sectional view showing the area adjacent the lower end of the compressor of FIG. 1 embodying the principles of the present invention.
Figure 3:
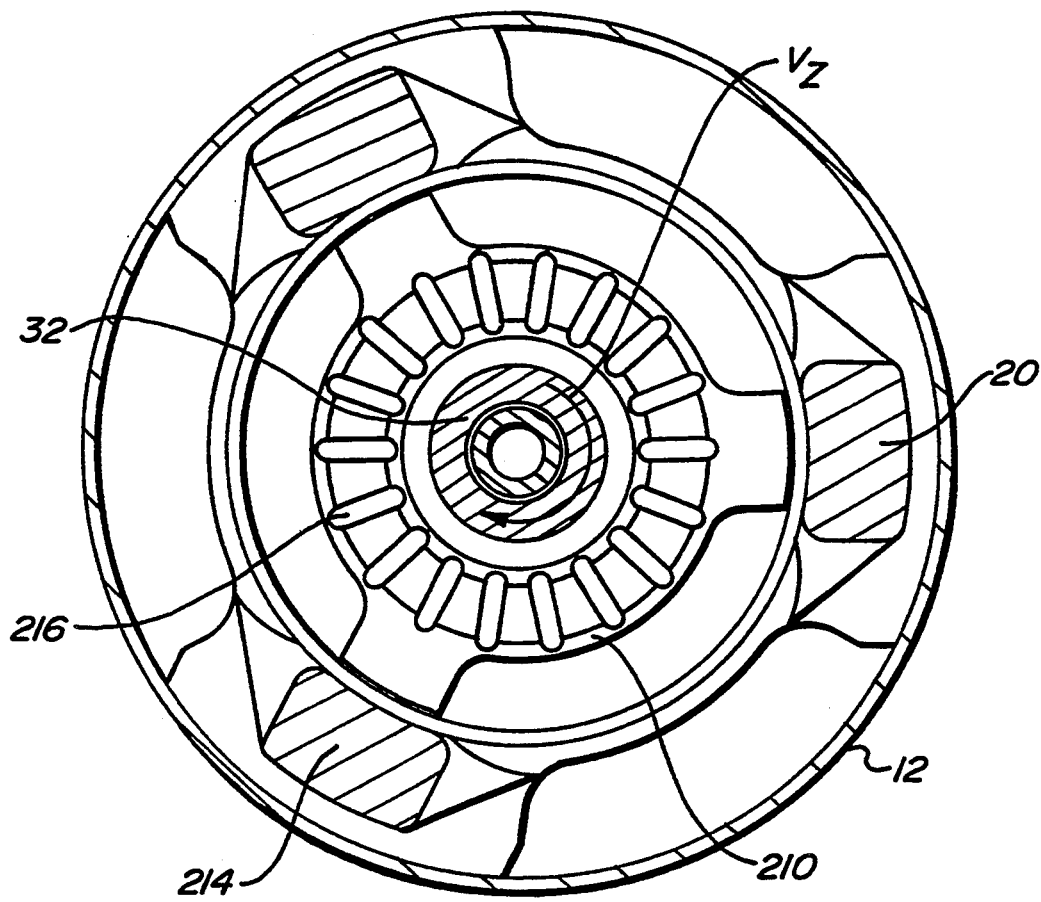
FIG. 3 is a plan view taken in the direction of arrows 3—3 in FIG. 1.

The space 212 between the lower end turn of motor windings 42 and cover plate 210 is full of oil and cavitation bubbles swirling at some tangential velocity $V_z$ during operation of compressor 10 as shown by the arrow in FIG. 3. The magnitude of $V_z$ is limited by viscous friction in the space 212 and the plurality of ribs 214 of lower housing 20. A radial pressure gradient develops due to this swirling rotation and some radial flow, $V_r$ shown by the arrows in FIG. 2, exists due to the vertically offset position of lower counterweight 46. In order to encourage additional radial flow in a controlled way, a plurality of formed radial slots 216 are incorporated into lower cover plate 210. Radial slots 216 will also resist the swirling action on the lower side of space 212. The radial pressure gradient is therefore reduced on the side of space 212 adjacent cover plate 210. This difference in the radial pressure gradient causes a radial circulating flow $F_R$ of oil as shown by the arrows in FIG. 2. This oil flow is small enough that it does not consume a significant amount of power, but it is large enough to significantly reduce motor temperature, especially at the high load low voltage operating conditions. This flow of oil is essentially insensitive to the oil level within the lubrication sump as long as the oil level is maintained within normal operating limits. The amount of flow can easily be controlled by selecting the appropriate depth of radial slots 216.

Radial slots 216 may be incorporated into lower bearing housing 20 during its manufacture, thus reducing or eliminating any costs associated with the machining of radial slots 216. The incorporation of radial slots 216 into lower bearing housing 20 thus eliminates the need for any type of auxiliary shield along with the assembly and durability issues arising from the use of the auxiliary shield.

The present invention thus prevents any significant lower counterweight oil pumping power loss, it provides additional motor cooling due to the controlled amount of radial oil circulation and it makes the lower counterweight oil pumping power loss essentially insensitive to the oil level within the lubrication sump. In addition, the undesirable general swirling of the oil within the lubrication sump is also reduced by the incorporation of the above described lubricant circulation system.

While the above detailed description describes the preferred embodiment of the present invention, it should be understood that the present invention is susceptible to modification, variation and alteration without deviating from the scope and fair meaning of the subjoined claims.

What is claimed:

1. A scroll machine comprising:
   a shell;
   a first scroll member disposed within said shell, said first scroll member having on one side a first spiral vane;
   a second scroll member disposed within said shell, said second scroll member having a second spiral vane disposed in interengaging relationship with said first spiral vane so that as said first scroll member orbits with respect to said second scroll member, moving pockets of changing volume are formed by said vanes;
   a drive member disposed within said shell for causing said scroll members to orbit with respect to one another;
   a lubricant sump containing a supply of lubricant disposed in the lower portion of said shell;
   a stationary cover plate disposed within said supply of lubricant, said cover plate including a plurality of radially extending slots which work in conjunction with said drive member to continuously circulate said supply of lubricant around said drive member to facilitate cooling of said drive member.

2. The scroll machine according to claim 1 wherein said drive member includes a lower counterweight, said lower counterweight working in conjunction with said cover plate to circulate said supply of lubricant.

3. The scroll machine according to claim 1 further comprising a lower bearing housing for rotatably journalling said drive member, said cover plate being secured to said lower bearing housing.

4. The scroll machine according to claim 3 wherein said cover plate is integral with said lower bearing housing.

5. A scroll machine comprising:
   a shell;
   a first scroll member disposed within said shell, said first scroll member having on one side a first spiral vane;
   a second scroll member disposed within said shell, said second scroll member having a second spiral vane disposed in interengaging relationship with said first spiral vane so that as said first scroll member orbits with respect to said second scroll member, moving pockets of changing volume are formed by said vanes;
   a motor member disposed within said shell, said motor member including a stator having end turns and a rotor;
   a lubricant sump containing a supply of lubricant disposed in said shell;
   a drive shaft extending into said sump, said rotor being drivingly secured to said drive shaft,
   a lower bearing housing disposed within said shell, said drive shaft being rotatably journalled in said lower bearing housing;

a cover plate disposed within said supply of lubricant and secured to said lower bearing housing, said cover plate including a plurality of radially extending slots which work in conjunction with said rotor to circulate said supply of lubricant around said end turns of said stator to facilitate cooling of said motor member.

6. The scroll machine according to claim 5 wherein said cover plate is integral with said lower bearing housing.

7. The scroll machine according to claim 5 wherein said drive member includes a lower counterweight, said lower counterweight working in conjunction with said cover plate to circulate said supply of lubricant.

8. A scroll machine comprising:
a shell;
a first scroll member disposed within said shell and having on one side a first spiral vane;
a second scroll member disposing within said shell and having a second spiral vane disposed in interengaging relationship with said first spiral vane so that as said scroll members orbit with respect to one another, moving pockets of changing volume are formed by said vanes;
a sump located within said shell for holding a supply of lubricating oil;
a drive member disposed within said shell for causing said scroll members to orbit with respect to one another, said drive member including a pump for supplying said lubricating oil from said sump to the moving components of said scroll machine;
a stationary cover plate disposed within said sump adjacent to said drive member, said cover including a plurality of radially extending slots, said cover plate and said drive member forming a chamber;
an impeller driven by said drive member and disposed within said chamber, said impeller in conjunction with said cover plate being operative to circulate lubricating oil within said sump around said drive member to facilitate cooling of said drive member.

9. The scroll machine according to claim 8 wherein said impeller is a lower counterweight for said scroll machine.

10. The scroll machine according to claim 8 wherein said drive member includes a lower counterweight, said lower counterweight working in conjunction with said cover plate to circulate said supply of lubricant.

11. The scroll machine according to claim 8 further comprising a lower bearing housing for rotatably journalling said drive member, said cover plate being secured to said lower bearing housing.

12. The scroll machine according to claim 11 wherein said cover plate is integral with said lower bearing housing.

* * * * *